Nov. 20, 1962 E. O. SPRUDE 3,065,384

MODULARIZED ELECTRICAL NETWORK ASSEMBLY

Filed Dec. 18, 1959

2 Sheets-Sheet 1

INVENTOR.
EDGAR O. SPRUDE
BY [signature]
AGENT

Nov. 20, 1962 E. O. SPRUDE 3,065,384

MODULARIZED ELECTRICAL NETWORK ASSEMBLY

Filed Dec. 18, 1959

2 Sheets-Sheet 2

INVENTOR.
EDGAR O. SPRUDE

BY [signature]

AGENT

United States Patent Office 3,065,384
Patented Nov. 20, 1962

3,065,384
MODULARIZED ELECTRICAL NETWORK ASSEMBLY

Edgar O. Sprude, Philadelphia, Pa., assignor to Burroughs Corporation, Detroit, Mich., a corporation of Michigan
Filed Dec. 18, 1959, Ser. No. 860,602
14 Claims. (Cl. 317—101)

The invention hereinafter described and claimed has to do with electrical network assemblies, and more particularly to the high density modular packaging of such networks in miniature assemblies. With still more particularity the invention relates to an improved form of the invention described and claimed in the co-pending patent application of Stanley Schneider entitled "Modularized Electrical Network Assembly," filed June 8, 1959, Serial No. 818,648, and assigned to the same assignee as the present invention.

High density packaging of electronic systems is being achieved, in part, by the development of small components, such as, transistors, diodes, capacitors, etc. However, such components in themselves do not meet complete miniaturization system requirements. Circuit interconnection and undesirable heat transfer among components are problems which also must be solved in parallel with the development of such components.

The fact that components can be made physically smaller does not imply that the power necessary for proper circuit operation would become proportionately less. Except for the change in energy used by line inductance and stray capacitance, the required power input in a given circuit is unchanged as long as signal and impedance levels remain unchanged. Therefore, dissipation of the heat resulting from the operation of these miniaturized networks is a very real problem. Then too, as the total packing volume is decreased in the designing of such miniaturized assemblies, the available surface area for interconnection of components and for the dissipation of the heat is decreased, thus making the solving of these problems more difficult. Another important consideration in the fabrication of such miniaturized assemblies is the difficulty in manufacturing them without high cost and the sacrifice of reliability.

Therefore, an important object of the present invention is to provide an improved modular electrical network assembly of miniature size which overcomes the disadvantages of the above-mentioned design factors by providing a construction facilitating circuit interconnection and affording rapid dissipation of the heat resulting from energization of the assembly.

Another object of the invention is to provide such an assembly which is substantially immune to thermal and physical shock, and to other environmental conditions.

It is also an important object of the invention to provide a unique miniaturized electrical system sub-assembly unit having extremely low volume and high density of electrical components.

Another object is to provide a unitized modular construction for electrical networks which reduces the technical level required of assembly and maintenance personnel.

More specifically, it is an object of the present invention to provide such a miniaturized modular electrical network assembly which is characterized by its simplicity of design, its rugged construction, and its ease of assembly and maintenance.

In accordance with the above objects and first briefly described, the present invention comprises an improved miniaturized modular electrical network or system assembly consisting of a plurality of unique triangularly-shaped miniature circuit sub-assemblies, or module units, nested around a heat exchanger and enclosed in a housing providing means for easily interconnecting the sub-assemblies into an electrical network assembly, the leads of which are connected to terminals on the exterior of the assembly in position for connection to associated apparatus. The terminals for the leads preferably are of the pin type and positioned at one end of the assembly for plugging the assembly into a socket connector.

A more complete understanding of the invention may be had from the following detailed description and by reference to the accompanying drawings in which.

Figures 1, 2:
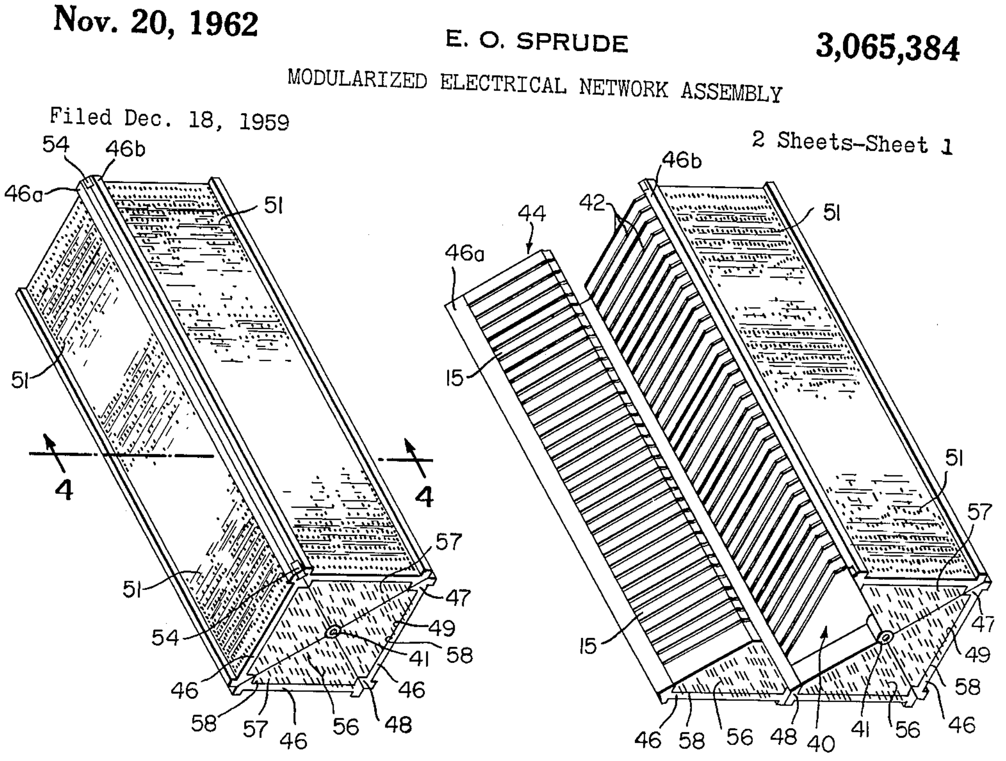
FIG. 1 is a perspective view of a miniaturized modular network assembly in accordance with the invention.
FIG. 2 is a perspective view similar to FIG. 1 but with the assembly partially opened, or unfolded, to show a portion of its interior.
Figure 7:
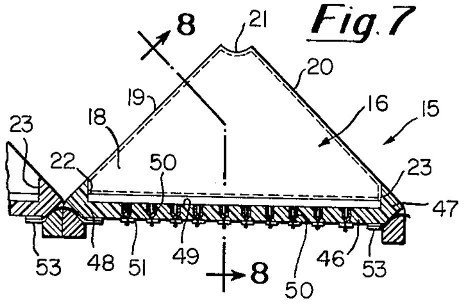
FIG. 7 is a sectional view through the module unit showing its plug-in relation to the assembly back planes or walls.

Broadly, the preferred form of the invention herein illustrated and described in detail comprises a modular electrical network or system assembly (FIG. 1) including a plurality of hermetically sealed sub-assemblies (FIG. 5), each sub-assembly comprising a separate circuit constructed essentially as a flat wafer, or chip, of substantially triangular shape, with exposed connector leads or pins extending from its bottom or base edge portion. The chips are stacked together in a housing with the exposed leads plugged through substantially planar housing walls and into electrically conductive relation with electrical conductors preferably printed on the exterior surfaces of the walls (FIGS. 1 and 7). The chips are assembled in stacked planes—four to a plane—to comprise an assembly of square cross-section (FIG. 4) and of any desired length, thus to form an electronic system or miniature modularized electrical network assembly having three major dimensions.

All of the components are hermetically sealed on the inside of the assembly while all of the interconnections between the sub-assembly units, or chips, are on the walls of the housing, preferably the outside surfaces. Each chip is provided with a quarter-circle notch on its innermost corner or apex of the triangle (FIG. 5), which cooperate in the assembly to form a hole (FIG. 4) extending axially therethrough to accommodate a heat exchanger, most suitably in the form of a metallic tube having radially extending fins (FIG. 3) at each end and between each adjacent planar group of four chips and in heat exchange relationship with the opposed major faces of the chips (FIG. 2).

Some of the printed circuit conductors on the exterior faces of adjacent housing walls may be interconnected by resilient or flexible conductors while others terminate at pin type terminals positioned at one end of the assembly for plug-in connection to associated apparatus. The flexible conductors may take any suitable form but it is preferred to form them in accordance with those described and claimed in the co-pending application of Glen R. Heidler, entitled "Hinge Structure," Serial No. 860,449, filed December 18, 1959, and assigned to the same assignee as the present invention.

The heat resulting from energization of the assembled system network is picked up by the fins across the minimum dimension of the chip, almost at its source, and is carried by the fins to the central tube where it may be conducted away by a suitable heat transfer medium, such as cooled circulating gas.

To afford some idea of the compactness of this miniaturized assembly, it is of interest that a module constructed in accordance with this invention is capable of containing—in round figures—approximately 5000 components of the kind mentioned above, in a housing having the dimensions of 2.125" x 2.125" x 6.0".

Figure 8:
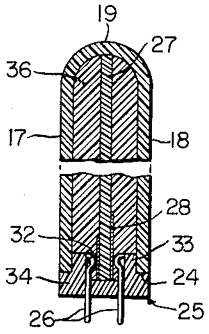
FIG. 8 is a sectional view taken along line 8—8 of FIG. 7.
Figure 9:
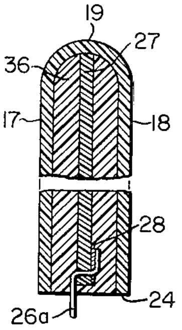
FIG. 9 is a view similar to FIG. 8, but of a modified form of the module chip.
Figure 10:
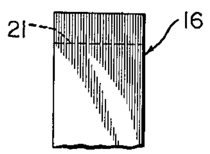
FIG. 10 is a fragmentary end view of another modified form of module unit, or chip.
Figure 11:
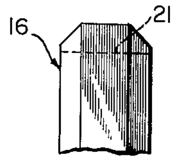
FIG. 11 is a fragmentary end view of still another modified form of module chip.

Now more specifically, and with reference to the details of the drawings, it is seen that FIG. 1 illustrates a complete modular network assembly constructed in accordance with the invention. However, for a clearer understanding of the details of this preferred form of the invention, the following description will begin with the smallest unit, the unique module wafer or chip 15, illustrated in FIGS. 5 through 8. The unit comprises a thin walled housing 16 formed by a flat substantially triangularly shaped envelope of suitable material, but which in this form of the invention is fabricated of electrically insulating material and including closely spaced opposite walls or faces 17 and 18, bridged along two sides by outwardly curved end walls 19 and 20, as shown in FIG. 8. The curved walls facilitate assembly both of the individual chips and of the whole assembly, as explained hereinafter. It should be understood, however, that end walls 19 and 20 may be of other suitable shapes, such as shown by way of example in FIGS. 9 and 10.

Each housing is provided with a quarter-circle notch 21 at the apex of the triangle where walls 19 and 20 meet, while the opposite ends 22 and 23 are truncated for the purpose more fully explained hereinafter. The bottom side 24 of the housing is closed by a terminal board 25 having electrically conductive pins 26 extending therethrough from its inner side to project from its outer side and provide the input and output terminals for the circuitry carried by the panel 27 within the housing.

Panel 27 is formed of electrically insulating material and in substantially the same size and triangular shape as housing 16. The circuit wires 28 on the panel preferably are of the printed type and provide the interconnecting means for the components 29 which may be supported on either or both sides of the panel, or in the plane of the panel through apertures 30 provided therein. Certain of the printed conductors terminate along the base or bottom edge 31 of panel 27 and are interconnected with certain of the pins 26 on terminal board 25, the pins not used being dead. The interconnection may be made in any suitable manner, such as by wires soldered to each, or by forming the terminal board as a plug-in connector, as shown in FIG. 8. In the latter case the lower edge 31 of the panel 27 is inserted in the socket 32 to place the printed wiring into contact with the resilient inner ends of pins 26. The terminal board preferably is formed with a portion 33 of reduced dimensions equal to the dimensions of and fitting within the space between the chip walls 17 and 18 at its open end 24.

In the manufacture of the chips the housing 16 preferably is molded of a suitable electrically insulating material. The printed circuit panel is fabricated with its printed wiring interconnecting the components mounted thereon, and then is assembled with the terminal board 25. It will be understood that the components carried on the printed circuit panel 27 may be naked transistors, diodes, capacitors, resistors, etc. and may be of the leadless type in which case suitable leads are provided for connecting the components in circuit and to the terminal pins 26. These leads may be formed in a variety of ways. For example, as indicated above, they may be of the printed circuit type or they may be formed by conductive paint, or even partially of both types. Alternatively the components may be of the type normally provided with lead wires for connection to printed circuitry on the panel 27. It will also be understood that both sides of the panel may be used for the printed circuitry and for the mounting of components.

Figure 5:
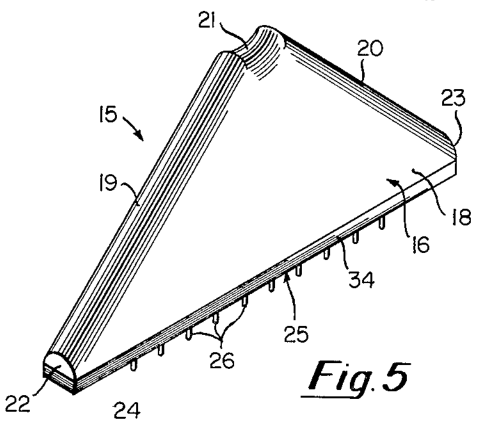
FIG. 5 is a perspective view of a typical module unit, or chip.

While it is not considered absolutely necessary, it is desirable to hermetically seal the printed circuit panel with its connectors and components within the housing 16. To this end the housing is substantially filled with a suitable moisture resistant fluid potting compound 36 such as epoxy resin, after which the panel is inserted into the housing. As the panel nears its fully inserted position between the side walls 17 and 18, its edges contact the curved end walls 19 and 20 which cam or guide it into a centrally located position between the walls. Simultaneously, the reduced portion 33 of terminal board 25 slips between the outer edges of the open end wall 24 of the housing thus to space these edges from each other and maintain them in the plane of side walls 17 and 18. Movement of the terminal board into the housing is terminated upon contact of the outer end of the walls by the flanged portions 34 of the terminal board. The outer edges of walls 17 and 18 may then be suitably sealed to the terminal panel, or alternatively the potting compound may be of such a nature that upon setting or curing, as the case may be, the whole chip is bonded together as a unitary structure as seen in FIG. 5.

Figure 6:
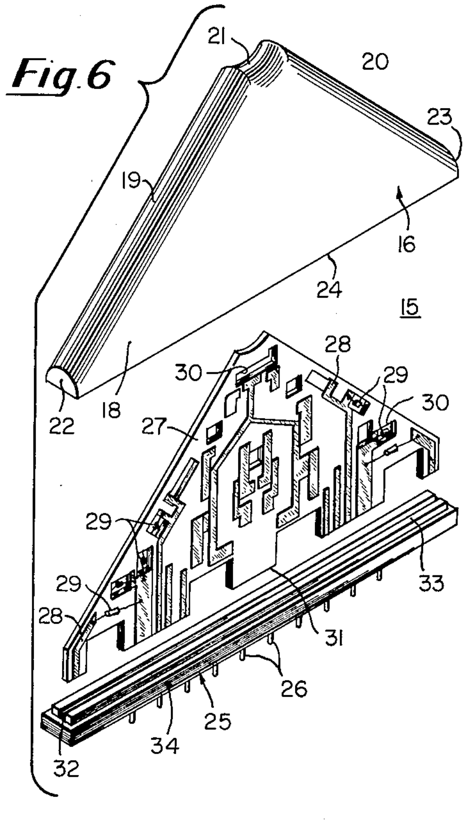
FIG. 6 is an exploded perspective view of the module unit shown in FIG. 5.

While the particular circuit is not important to an understanding of the invention, the circuit shown in FIG. 13 of the above-identified co-pending application of Stanley Schneider may be referred to as being exemplary of a typical flip-flop circuit the components of which may be packaged in the chip in the manner shown in FIG. 6. In this regard it is of interest to note that the large number of components used in this circuit have been packaged in a chip, the exterior dimensions of which are 1.750" across the base of the triangle from corner 22 to corner 23, and an altitude or height of .980", an area of approximately 1 square inch, and with a negligible depth of 0.116".

If desired the chips may be constructed without the use of terminal board 25. In this case the panel 27 is provided with auxiliary pins **26*a*** (FIG. 9) for connecting the circuit sub-assembly to an associated system network, as described below.

One of the important advantages of the above-described chip construction is that components such as diodes, transistors, etc. may be packaged into the chip without their usual individual housings, and all simultaneously hermetically sealed in the chip by the potting compound 36, thus to effect a considerable saving in volumetric requirement for these individual components, not to mention the monetary saving, which would be considerable. A disadvantage, of course, as pointed out above, resides in the small area available for circuit interconnection and for the dissipation of the heat. However, these difficulties are overcome by the construction now to be described.

The connector pins 26 on the terminal board 25 serve all input and output functions of the chip, and make it a plug-in unit.

Referring now to FIGS. 1 through 4 and 7, it can be seen how a plurality of the above-described chips are used to form a modular network assembly which may, for example, comprise a complete "arithmetic register" for a computer including a series of flip-flop and diode logic circuits, each comprising one of the above-described chips.

Figure 4:
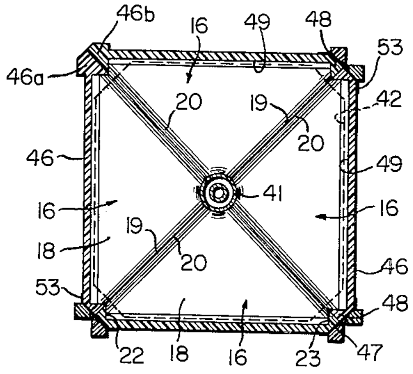
FIG. 4 is a sectional view through the assembly taken along line 4—4 of FIG. 1.

Referring now to FIGS. 2 and 4, it is seen that in the complete assembly the chips 15 are arranged or nested around a heat exchanger 40 including in this form of the invention a tubular member 41 and a plurality of radially extending flat fins 42. The tube extends axially through the assembly in the aperture formed by joining groups of four of the triangular shaped chips in a plane, as shown in FIG. 4, with the notches 21 in the center.

Figure 3:
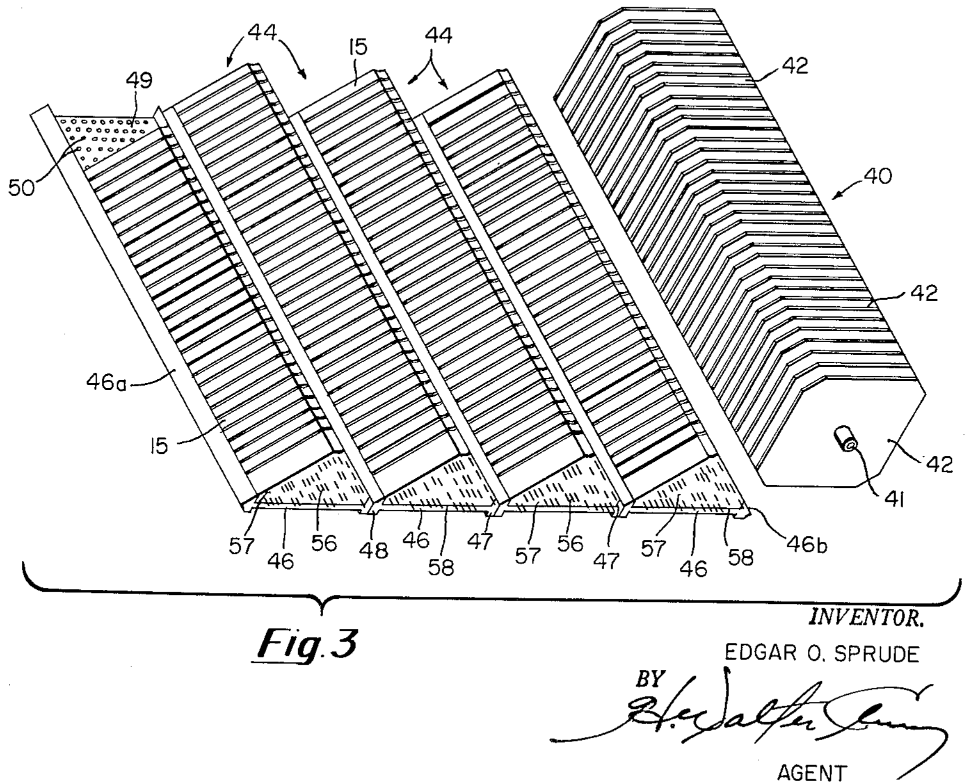
FIG. 3 is a perspective view of an assembly completely opened as if for servicing or assembling.

In assembling the module in accordance with the preferred embodiment, the chips are first arranged in four individual stacks 44, see FIG. 3, each stack along a substantially planar member 46 each forming a side wall of the module when completely assembled, as shown in FIG. 1. Referring again to FIGS. 3 and 7, it will be seen that each of the wall members 46 is provided with upstanding wall portions 47 and 48 on opposite edges of its inner surface 49, as seen in FIG. 7, and which extend throughout the length of the panel (FIG. 3). Between the edge walls 47 and 48 each wall member 46 is provided with a plurality of apertures 50 aligned transversely thereacross from side to side. The outer surface of each wall, as seen in FIG. 1, carries the printed circuitry 51 for the purpose of interconnecting the chips in the manner now to be described.

Each of the chips is plugged into its associated wall member 46 by inserting the terminal pins 26 in the apertures 50 until the chip is nestled against the inner surface 49, and with its ends 22 and 23 abutting the inner surface of the edge walls 47 and 48 respectively. The terminal pins 26 may be of sufficient length to extend through the wall members to be interocnnected with selected portions of the printed wiring on the outer surface of the walls by dip soldering, if desired, and thereby electrically connect the various chips in the desired circuit.

Alternatively the apertures 50 may be provided with connector means of conventional design for receiving and interconnecting pins 26 with the desired circuitry on the associated wall member. Preferably, however, such connectors will be in accordance with that described and claimed in the co-pending application of Stanley Schneider entitled, "Electrical Connector," Serial No. 5,503, filed Jan. 29, 1960, and assigned to the assignee of the present invention.

Interconnection of the electrical conductors on different walls 46 may be accomplished in any suitable manner, but it is preferred to do this in accordance with the method shown in the above-identified "Hinge Structure" application of Glen R. Heidler, that is, by utilizing the electrically conductive elements 53 which also serve to hinge the panels together, as seen in FIG. 7.

After the chips are stacked on walls 46, the heat exchanger element 40 is assembled with one of the panels by interleaving or sandwiching the fins 42 between the chips and then pressing the element downwardly until the tube 41 rests in the aligned notches 21. Insertion of the heat exchanger is facilitated by the curved end walls 19 and 20 of the chips which guide the fins in between each pair of chips. Thus it is seen that the curved end walls of the chips serve a dual function, that is, on the inside by guiding the printed circuit panel into the housing to a central position, and on the outside by guiding the fins 42 between the chips.

With the heat exchanger so aligned on one wall 46, it is then necessary only to fold the walls about their interconnecting hinges 53 from right to left as shown here, whereby the fins are successively inserted between the chips aligned on adjacent walls, as shown in FIG. 2 illustrating the assembly prior to the last folding of a wall. As the final step after the last wall member 46 is folded into place, as shown in FIG. 1, the outside edges **46*a* and 46*b* of the adjacent end walls are releasably secured together in a suitable manner, such as by the latch element 54**, shown in FIG. 1.

While the heat exchanger 40 provides other assets, such as a strengthening backbone for the assembly, its primary purpose is to dissipate the heat generated during the time the assembled network is energized. The heat of the chips is picked up by the fins 42 across the least dimension of the chip and therefore substantially at the source of the heat. The fins conduct the heat to the tube 41 from which it is removed by a cooling fluid, such as cool gas, circulated through the tube. While the cooling fluid may be passed through the tube 41, it is preferred to construct the tube with its inlet and outlet at the same end, as in the above-identified Schneider invention, by forming the tube with two parallel passages interconnected at the end opposite to the inlet and outlet end.

So that the module, as now assembled, may be adapted for plug-in connection to associated apparatus, as shown in the Schneider application, or in the co-pending application of Glen R. Heidler entitled, "Housing for Packaging Miniaturized Modular Electrical Network Assemblies" filed December 29, 1959, Serial No. 862,596, and assigned to the same assignee as the present invention, certain of the conductors 51 on the exterior walls of the housing terminate at one end of the housing, the right end as shown in FIG. 1, where they are interconnected with terminal pins 56 projecting from end wall members 57.

These end walls are of the same triangular shape as the chips but are somewhat thicker to provide sufficient room for directing the pins to its base end wall 58 for plug-in assembly with the housing wall members. The pins are of sufficient length to extend through the housing walls 46 and into contact with the printed wiring on the outer surface of the walls. Alternatively—or simultaneously—some of the pins may be interconnected with the printed wiring by short wire leads connected to both.

Another feature of the heat exchanger in the assembly is that the fins 42, by judicious choice of metal from which the heat exchanger is fabricated, may be used as a shield between components in adjacent wafer modules when necessary.

From the above it is seen that the present invention provides an improved modular electrical network assembly of miniature size completely fulfilling the needs of the industry for a miniaturized electronic system providing a complex network of unique electronic circuit sub-assemblies—or chips—in a minimum of area, yet providing for rapid assembly, easy interconnection of the components, and rapid removal of the heat generated by the assembly when energized.

I claim:

1. A miniaturized modular electrical network assembly comprising, a housing of polygonal cross section formed by wall members of electrically insulating material, electrical conductors on said walls, a plurality of substantially triangularly shaped wafer-like circuit sub-assemblies stacked on each of said housing walls, each of said sub-assemblies having one or more terminals extending from one edge thereof and into electrically conductive contact with selected ones of said conductors on its associated housing wall, and a heat exchanger having portions in heat exchange relationship with each of said triangular sub-assemblies whereby heat generated therein when said network is energized is transferred through the said portions to the heat exchanger.

2. A miniaturized modular electrical network assembly comprising, a housing of polygonal cross section formed by wall members of electrically insulating material, electrical conductors on said walls, a plurality of substantially triangularly shaped wafer-like circuit sub-assemblies stacked on each of said housing walls, each of said sub-assemblies having one or more terminals along one edge thereof in electrically conductive contact with selected ones of said conductors on its associated housing wall, the innermost corner or apex of each of said triangularly shaped sub-assemblies being notched, the notches of all the stacked sub-assemblies cooperating to form an axial opening through the assembly, and a heat exchanger positioned within said axial opening, said heat exchanger having portions in heat exchange relationship with each of said triangular sub-assemblies whereby heat generated therein when said network is energized is transferred through the said portions to the heat exchanger.

3. A miniaturized modular electrical network assembly comprising, a housing of polygonal cross section formed by wall members of electrically insulating material, electrical conductors on said walls, a plurality of triangularly shaped wafer-like circuit sub-assemblies arranged in stacked relation with each other on each of said housing walls, each of said sub-assemblies being releasably secured to its respective wall by terminals extending from one edge thereof and into electrically conductive contact with conductors on its associated housing wall, the innermost corner or apex of each of said triangularly shaped sub-assemblies being shaped with a notch, all of which cooperate to form an axial opening through the assembly, and a metallic heat exchanger positioned within said axial opening, said heat exchanger having thin integral fins extending between and in heat exchange relationship with opposing surfaces of said sub-assemblies whereby heat generated by said sub-assemblies when said network is energized is transferred through the fins to the heat exchanger.

4. A miniaturized modular electrical network assembly comprising, a rectangular housing formed by four substantially planar side wall members of electrically insulating material joined along the opposite parallel side edges thereo, printed electrical conductors on the outside surface of each of said walls, a plurality of triangularly shaped wafer-like circuit sub-assemblies arranged in stacked relationship with each other on each of said housing walls, each of said sub-assemblies having terminals extending from one edge thereof and into electrically conductive contact with selected of the conductors on its associated housing wall, the innermost corner of each of said triangularly shaped sub-assemblies being formed with a circular notch, said notches cooperating to form an axial opening through the assembly, and a tubular metallic heat exchanger positioned within said axial opening, said heat exchanger having thin integral fins extending between and in heat exchange relationship with opposing surfaces of said sub-assemblies whereby heat generated when said network is energized is transferred through the fins to the heat exchanger and to the exterior of said assembly.

5. A miniaturized modular electrical network assembly comprising, a rectangular housing formed by four substantially planar side wall members of electrically insulating material and having side edge wall portions, means interconnecting adjacent wall members along opposite parallel side edges thereof, electrical conductors printed on an exterior surface of each of said walls, a plurality of triangularly shaped wafer-like hermetically sealed circuit sub-assemblies arranged in stacked relationship with each other on each of said housing walls, each of said sub-assemblies having terminals extending from one edge thereof and plugged into its associated housing wall and into electrically conductive contact with selected of the conductors on the surface of its associated housing wall, said triangularly shaped sub-assemblies having its base corners truncated thus to form walls abutting said side edge wall portions, the innermost corner or apex of each of said triangularly shaped sub-assemblies being notched, the notches cooperating to form an axial opening through the assembly, and a metallic heat exchanger positioned within said axial opening, said heat exchanger having thin integral fins extending between and in heat exchange relationship with opposing surfaces of said sub-assemblies whereby heat generated when said network is energized is transferred through the fins to the heat exchanger and to the exterior of said assembly.

6. In a modular electrical network assembly, a plurality of substantially triangularly shaped wafer-like circuit sub-assemblies, each of said sub-assemblies comprising a substantially flat triangularly shaped envelope having closely spaced major side walls connected by end walls, terminal pins secured to and extending from the interior side of one of said end walls to project from the exterior side, and a circuit sub-assembly within said envelope, and having circuit wires interconnecting components of said sub-assembly with each other and to said terminal pins.

7. A construction according to claim 6 wherein the end walls closing the sides forming the apex of the triangular envelope are outwardly bowed, and the end wall closing the remaining side is a removable terminal board.

8. In a modular electrical network assembly, a plurality of substantially triangularly shaped wafer-like circuit sub-assemblies, each of said sub-assemblies comprising: a substantially flat triangularly shaped envelope having closely spaced major side walls interconnected on two sides by end walls; a circuit panel housed within said envelope, said panel being of substantially the same size and triangular shape as said envelope; circuit components carried by said panel; and circuit wires interconnecting said components with each other and extending to the outside of said envelope to provide terminal pins.

9. In a modular electrical network assembly, a plurality of substantially triangularly shaped wafer-like circuit sub-assemblies, each of said sub-assemblies comprising, a substantially flat triangularly shaped envelope having closely spaced major side walls interconnected on two sides by integral end walls, a terminal board closing the other end of said envelope, terminal pins secured to and extending from the interior side of said terminal board to project from the exterior side, a circuit panel within said envelope, said panel being of substantially the same triangular shape and size as said envelope, circuit components carried by said panel, and printed circuit wires interconnecting said components with each other and to said terminal pins.

10. In a modular electrical network assembly, a plurality of triangularly shaped wafer-like hermetically sealed circuit sub-assemblies, each of said sub-assemblies comprising a substantially flat triangularly shaped envelope having closely spaced major side walls interconnected on two sides by integral end walls, a terminal board closing the other side of said envelope, terminal pins secured to and extending from the interior side of said terminal board to project from the exterior side, a circuit panel within said envelope, said panel being of substantially the same triangular shape and size as said envelope, circuit components carried by said panel, printed circuit conductors interconnecting said components with each other and to said terminal pins, and a potting compound filling said envelope and hermetically sealing said panel with its components and conductors within said envelope.

11. In a modular electrical network assembly, a plurality of triangularly shaped wafer-like hermetically sealed circuit sub-assemblies, each of said sub-assemblies comprising a substantially flat triangularly shaped envelope having closely spaced major side walls connected on two sides by outwardly bowed end walls, means closing the other side of said envelope, terminal pins secured to and extending from the interior side of said closure means to project from the exterior side, a printed circuit panel within said envelope, said panel being of substantially the same triangular shape and size as said envelope and centrally positioned between said side walls by contact of two of its edges with the interior side of said bowed end walls, circuit components carried on said panel, printed circuit wires interconnecting said components with each other and to said terminal pins, and a potting compound filling said envelope and hermetically sealing said panel within said envelope.

12. A miniature circuit sub-assembly comprising: a flat housing formed by a pair of closely spaced flat triangularly shaped side walls interconnected on the two sides forming the apex of the triangle by end walls of outwardly curved configuration, and a terminal board closing the other side; connector pins extending through said terminal board and providing plug-in connectors for the sub-assembly; a flat circuit panel encased within said housing, said circuit panel having substantially the same triangular shape as said housing and having the edge portions thereof forming the apex of the triangle seated against the inner surface of the outwardly curved end walls of said housing thus to center the panel between said side walls, the other or base edge of said circuit panel being adjacent the inner surface of said terminal board; electrical components mounted on said panel; electrical conductors interconnecting said components, certain of said electrical conductors terminating along said other or base edge of said panel; and conductor means interconnecting said terminations of said electrical conductors to certain of said connector pins.

13. A miniature circuit sub-assembly comprising: a thin flat housing formed by a pair of closely spaced flat triangularly shaped side walls of electrically insulating material interconnected on the sides forming the apex of the triangle by integrally formed and outwardly bowed end walls, and a terminal board of electrically insulating material closing the other side, the apex of said housing being formed with a notch to facilitate assembly with associated apparatus; connector pins extending through said terminal board and providing plug-in connectors for the sub-assembly; a flat circuit panel of electrically insulating material encased within said housing, said circuit panel being of only slightly less size yet having substantially the same triangular shape as said housing, and having its edge portions forming the apex of the triangle seated against the inner surfaces of the outwardly curved end walls of said housing thus to center the panel between said side walls, the other or base edge of said circuit panel being secured to the inner surface of said terminal board; electrical components mounted on said panel; circuit wires printed on said panel and interconnecting said components, certain of said printed wires terminating along said other or base edge of said panel in contact with certain of said connector pins; and a potting compound hermetically sealing said panel and its associated components and conductors within said housing.

14. A miniaturized modular electrical network assembly comprising, a housing of polygonal cross section formed by wall members of electrically insulating material, electrical conductors on said walls, a plurality of substantially triangularly shaped wafer-like circuit sub-assemblies stacked on each of said housing walls, each of said sub-assemblies having one or more terminals along one edge thereof in electrically conductive contact with selected ones of said conductors on its associated housing wall, and a heat exchanger having portions in heat exchange relationship with each of said triangular sub-assemblies whereby heat generated therein when said network is energized is transferred through the said portions to the heat exchanger.

References Cited in the file of this patent

UNITED STATES PATENTS 2,796,559 Feucht ---------------- June 18, 1957
2,816,253 Blitz ------------------ Dec. 10, 1957

FOREIGN PATENTS 211,658 Australia -------------- June 21, 1956
1,060,487 Germany -------------- July 2, 1959